(12) United States Patent
Lam et al.

(10) Patent No.: US 8,839,451 B1
(45) Date of Patent: Sep. 16, 2014

(54) ACTIVATION AND SECURITY OF SOFTWARE

(75) Inventors: Monica Sin-Ling Lam, Menlo Park, CA (US); Constantine P. Sapuntzakis, Mountain View, CA (US); Dan Boneh, Palo Alto, CA (US); Ramesh U. V. Chandra, Belmont, CA (US)

(73) Assignee: Moka5, Inc., Redwood City, CA (US)

( * ) Notice: Subject to any disclaimer, the term of this patent is extended or adjusted under 35 U.S.C. 154(b) by 1839 days.

(21) Appl. No.: 11/835,339

(22) Filed: Aug. 7, 2007

Related U.S. Application Data

(60) Provisional application No. 60/836,255, filed on Aug. 7, 2006.

(51) Int. Cl.
*G06F 7/04* (2006.01)
*G06F 12/14* (2006.01)

(52) U.S. Cl.
USPC ............................ 726/27; 713/193; 713/194

(58) Field of Classification Search
None
See application file for complete search history.

(56) References Cited

U.S. PATENT DOCUMENTS

| | | | | |
|---|---|---|---|---|
| 6,993,664 B2 * | 1/2006 | Padole et al. | ............... | 705/59 |
| 7,296,267 B2 * | 11/2007 | Cota-Robles et al. | ............ | 718/1 |
| 7,796,013 B2 * | 9/2010 | Murakami et al. | ........... | 340/5.82 |
| 2001/0044782 A1 * | 11/2001 | Hughes et al. | ................. | 705/59 |
| 2001/0051928 A1 * | 12/2001 | Brody | ............................. | 705/52 |
| 2002/0010863 A1 * | 1/2002 | Mankefors | ..................... | 713/189 |
| 2002/0174356 A1 * | 11/2002 | Padole et al. | ................. | 713/200 |
| 2004/0010788 A1 * | 1/2004 | Cota-Robles et al. | ............ | 718/1 |
| 2004/0039923 A1 * | 2/2004 | Koskins | ....................... | 713/189 |
| 2004/0177168 A1 * | 9/2004 | Alabraba et al. | .................. | 710/1 |
| 2004/0177354 A1 * | 9/2004 | Gunyakti et al. | ............. | 717/174 |
| 2006/0026604 A1 * | 2/2006 | Tan et al. | ....................... | 719/331 |
| 2006/0101189 A1 | 5/2006 | Chandrasekaran et al. | | |
| 2006/0112416 A1 * | 5/2006 | Ohta et al. | ........................ | 726/1 |
| 2006/0277542 A1 | 12/2006 | Wipfel | | |
| 2007/0006205 A1 | 1/2007 | Kennedy et al. | | |
| 2007/0014414 A1 * | 1/2007 | Benedikt | ........................ | 380/278 |
| 2007/0063816 A1 * | 3/2007 | Murakami et al. | ........... | 340/5.82 |
| 2007/0089111 A1 | 4/2007 | Robinson et al. | | |
| 2007/0162521 A1 | 7/2007 | Raghunath | | |
| 2007/0198713 A1 | 8/2007 | Tsao et al. | | |
| 2008/0104588 A1 | 5/2008 | Barber et al. | | |

FOREIGN PATENT DOCUMENTS

| | | | |
|---|---|---|---|
| JP | 2006072591 A | 3/2006 | |
| WO | 2006/036277 A2 | 4/2006 | |
| WO | 2007/149671 A2 | 12/2007 | |

* cited by examiner

*Primary Examiner* — Fatoumata Traore
(74) *Attorney, Agent, or Firm* — Park, Vaughan, Fleming & Dowler LLP

(57) ABSTRACT

Methods, systems, and apparatus, including computer program products, for retaining the function of product activation schemes and other persistent state changes based on hardware identifiers, even when running in a virtual machine monitor. It can tie such schemes to a single identifier, e.g., a USB serial number, instead of the multiple hardware identifiers.

6 Claims, 2 Drawing Sheets

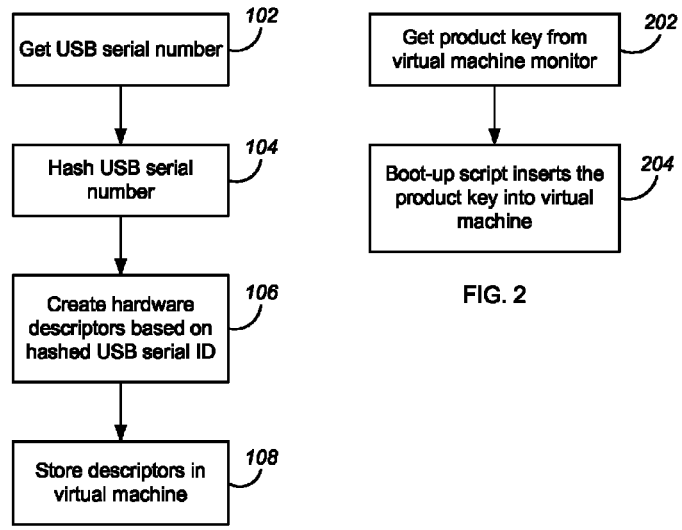
FIG. 1
FIG. 2
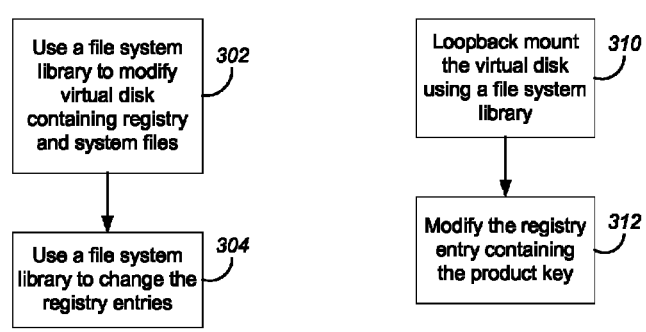
FIG. 3A
FIG. 3B

ACTIVATION AND SECURITY OF SOFTWARE

CROSS-REFERENCE TO RELATED APPLICATIONS

This application claims the benefit under 35 U.S.C. §119(e) of U.S. Patent Application No. 60/836,255, titled "Hardware-Based Activation of Software Installed on a Virtual Machine or Mobile Device," filed Aug. 7, 2006, which is incorporated here by reference.

BACKGROUND

This specification relates to software copy protection for software installed on virtual machines or mobile devices.

Some software copy protection schemes tie a software license to a specific computer. Microsoft® Windows Product Activation (WPA) is an example. With WPA, activation occurs whenever Microsoft® Windows is installed on a computer. To identify the computer, WPA collects information about the hardware, including, for example, memory size, network MAC address (Media Access Control address), or hard disk model name. The activation module in Windows sends a representation of this information along with a product key to Microsoft over the Internet. The product key is intended to identify a single copy or license of Windows. If Microsoft has seen that product key with too many different computer representations, the activation server can refuse the activation. WPA also records the activation information including the hardware information on the hard drive of the computer on which Windows is installed.

On subsequent reboots, WPA checks the current hardware information against the recorded version—if the hardware differs too much then it assumes that the Windows copy has been moved to a different computer, in possible violation of the license, and requests that the user perform the activation process again.

More generally, in a hardware-based activation process for a software product, when the product is installed or run for the first time, the product gets one or more hardware descriptors from the computer on which the product is (or is being) installed. Each hardware descriptor identifies or describes an item of hardware installed on the computer and generally includes description information for a hardware feature that can be used to identify the computer, for example, memory size, network MAC address, or hard disk model name. The description information can take the form of a text string. The product can collect the hardware descriptor information from the underlying computer or operating system. The product sends the hardware descriptors to an authentication site, e.g., over the Internet, which will grant or deny authentication. The site might deny authentication if, for example, the product key had previously been activated with too many different hardware descriptors, suggesting that the product is being installed on a different computer, rather than on the same computer with upgraded hardware. If activation is granted, the product saves the hardware description as part of activation information for use when the product is run later.

When the product is run later, the product checks whether the computer on which the product is run shares enough similarities with the hardware description saved in the activation information at the time activation was granted. If the computer shares enough similarities, the product continues to run. Otherwise, the product asks the user to activate the product again, going through the actions described above.

This scheme will fail to tie the software to a product if the product is installed on a virtual machine. Because all its devices are virtual, a virtual machine monitor or a hypervisor will return the same hardware description information to a guest operating system or application regardless of the computer on which the virtual machine is run.

SUMMARY

This specification describes technologies relating to supporting copy protection schemes that tie a software license to a specific computer when the software is installed on a virtual machine.

For example, when an operating system such as Windows is running in a virtual machine, the virtual machine monitor presents the operating system with a set of hardware identifiers generated by the monitor. The identifiers are generally specific to the virtual machine monitor and identical across hardware platforms. This would defeat the activation check.

To address such situations, the technologies described in this specification can be embodied in methods that include the actions of: deriving from a first hardware device attached to a computer hardware device one or more different descriptor values for a virtual machine running on the computer; and establishing the hardware device descriptor values as the respective hardware device descriptors in the group of hardware device descriptors for the virtual machine before the software product is run or activated on the virtual machine.

In general, one aspect of the subject matter described in this specification can be embodied in methods that include the actions of deriving from a first hardware device attached to a computer hardware device one or more different descriptor values; and establishing the one or more different descriptor values as one or more of the respective hardware device descriptors in the group of hardware device descriptors for use in identifying a computer platform before the software product is run or activated on the computer platform. Other embodiments of this aspect include corresponding systems, apparatus, and computer program products.

In general, another aspect of the subject matter described in this specification can be embodied in methods that include the actions of deriving from a user password one or more different descriptor values for a virtual machine running on the computer; and establishing the one or more different descriptor values as one or more of the respective hardware device descriptors in the group of hardware device descriptors for the virtual machine before the software product is run or activated on the virtual machine. Other embodiments of this aspect include corresponding systems, apparatus, and computer program products.

In general, another aspect of the subject matter described in this specification can be embodied in methods that include the actions of deriving from a stored biometric profile one or more different descriptor values for a virtual machine running on the computer; and establishing the one or more different descriptor values as one or more of the respective hardware device descriptors in the group of hardware device descriptors for the virtual machine before the software product is run or activated on the virtual machine. Other embodiments of this aspect include corresponding systems, apparatus, and computer program products.

In general, another aspect of the subject matter described in this specification can be embodied in methods that include the actions of extracting an activation state from an activated virtual machine image; and injecting the activation state into a second different virtual machine image. Other embodiments of this aspect include corresponding systems, apparatus, and computer program products.

In general, another aspect of the subject matter described in this specification can be embodied in methods that include the actions of injecting a Windows Security Identifier (SID) into a virtual machine image without booting the virtual machine image, comprising modifying the file system in the virtual machine, replacing the SIDs in the file system data structures, replacing the SIDs in the registry files on the file systems of virtual machine image. Other embodiments of this aspect include corresponding systems, apparatus, and computer program products.

In general, another aspect of the subject matter described in this specification can be embodied in methods that include the actions of transmitting a generic virtual machine image to a host computer, the generic virtual machine image including a software product installed on a virtual machine; transmitting, to the host computer, a product key for the software product; and transmitting, to the host computer, injection software to particularize the installed software product with the product key. Other embodiments of this aspect include corresponding systems, apparatus, and computer program products.

In general, another aspect of the subject matter described in this specification can be embodied in methods that include the actions of transmitting a generic virtual machine image to a host computer, the generic virtual machine image including a software product installed on a virtual machine; transmitting to the host computer a product key for the software product; and transmitting to the host computer directions used by the host computer insertion software to particularize the installed software product with the product key. Other embodiments of this aspect include corresponding systems, apparatus, and computer program products.

In general, another aspect of the subject matter described in this specification can be embodied in methods that include the actions of tying a software product to a portable storage device by running code on a computer before the product executable runs on the computer, where the code inserts a license data structure into a location expected by the product depending on whether the portable storage device currently attached to the computer matches one authorized to run the software. Other embodiments of this aspect include corresponding systems, apparatus, and computer program products.

In general, another aspect of the subject matter described in this specification can be embodied in methods that include the actions of running code on a computer before a software product executable runs on the computer, where the code decrypts a license based on the identifiers of the portable storage device, one or more biometrics of a user or a user password and inserts a resulting decrypted license into a location expected by the software product, the resulting decrypted license being an invalid license if the decryption fails. Other embodiments of this aspect include corresponding systems, apparatus, and computer program products.

In general, another aspect of the subject matter described in this specification can be embodied in methods that include the actions of adding an activation check to a software product, the software product being in executable form, by rewriting the executable form to include executable instructions implementing the activation check. Other embodiments of this aspect include corresponding systems, apparatus, and computer program products.

In general, another aspect of the subject matter described in this specification can be embodied in methods that include the actions of adding activation to a software product by placing valid license data structure in a location the software product expects to find the license data structure after successful activation check. Other embodiments of this aspect include corresponding systems, apparatus, and computer program products.

In general, another aspect of the subject matter described in this specification can be embodied in methods that include the actions of identifying a portable storage device to an activation module using a challenge response protocol. Other embodiments of this aspect include corresponding systems, apparatus, and computer program products.

In general, another aspect of the subject matter described in this specification can be embodied in systems that include a portable storage device configured for authenticating a host device operatively coupled to the portable storage device, where the authenticating is at least partially performed by a remote network service accessible through the host device, where the host device generates a signed statement identifying software running on the host device, and sends the signed statement to the remote network service, and in response the remote network service returns a secret known by the user of the portable storage device but not known by the host device. Other embodiments of this aspect include corresponding methods, apparatus, and computer program products.

In general, another aspect of the subject matter described in this specification can be embodied in methods that include the actions of detecting a command to run software off a portable storage device and, in response, running the software with reduced privileges. Other embodiments of this aspect include corresponding systems, apparatus, and computer program products.

In general, another aspect of the subject matter described in this specification can be embodied in methods that include the actions of detecting a key sequence entered by a user on a keyboard device; recognizing the key sequence as a proxy for a string containing sensitive information; retrieving the string using a transformation of the key sequence; and inserting the string into a virtual machine. Other embodiments of this aspect include corresponding systems, apparatus, and computer program products.

In general, another aspect of the subject matter described in this specification can be embodied in methods that include the actions of receiving information at a trusted portable device, the information being encrypted by the portable device; transmitting the encrypted information to a virtual machine monitor; and, at the virtual machine monitor, decrypting the information and inserting the information into a virtual machine. Other embodiments of this aspect include corresponding systems, apparatus, and computer program products.

Particular embodiments of the subject matter described in this specification can be implemented to realize one or more of the following advantages. Copy protection of copyrighted software is provided for hardware-based activation of software installed on a virtual machine. The software can be tied to a specific piece of hardware, even if the software is running in a virtual machine monitor. Copy protection can be achieved without requiring changes to the hardware-based activation license management mechanisms in the software in the virtual machine. The same image and updates to the same image can be distributed, and product key and activation information can be maintained across virtual machine upgrades. Product keys can be set in a generic virtual machine, and an individualized product key or a representation of a user license can be injected into the image.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates a method for creating hardware descriptors that are specific to a USB drive.

FIG. 2 illustrates a method for installing a product key on a product installed on a virtual machine.

FIGS. 3A and 3B illustrate ways of injecting a product key into a virtual machine without booting up the machine.

Like reference numbers and designations in the various drawings indicate like elements.

DETAILED DESCRIPTION

Figure 4A:
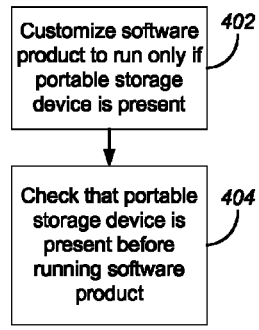
FIGS. 4A and 4B illustrate copy protection methods that operate when a software product is dynamically installed or running from a portable storage device.

FIG. 1 illustrates a method for creating one or more hardware descriptors for a virtual machine, where the descriptors are specific to a USB (Universal Serial Bus) drive attached to the host computer on which the virtual machine is running. Using such a method to provide hardware descriptors to a software product can allow WPA and similar schemes based on hardware identifiers to be effective, even when the protected software product is running on a virtual machine. It can, in effect, tie WPA or similar schemes to a single identifier, like a USB serial number, instead of multiple identifiers. In alternative implementations, the hardware descriptors can be specific to and derived from some kind of hardware device other than a USB drive. Generically, this device will be referred to as an authentication device. Because the hardware device descriptors derived for a virtual machine are essentially unique to the authentication device, once a software product is activated in the presence of the authentication device, the same authentication device needs to be present for the product to continue to run without re-activation. The method assumes that the virtual machine has a license suitable for use with the activation service. For example, activation generally requires each virtual machine to be activated to have a unique product key, which is a representation of the license. If the virtual machine does not have suitable license for activation, one of the techniques described later in this specification can be used to customize the virtual machine with a suitable license.

Some implementations use a modified QEMU virtual machine monitor. QEMU is a machine emulator: it can run an unmodified target operating system (such as Windows or Linux) and all its applications in a virtual machine. QEMU itself runs on several host operating systems such as Linux, Windows and Mac OS X. The host and target CPUs can be different. QEMU is described in Bellard, Francis, QEMU, a Fast and Portable Dynamic Translator, Proceedings of the USENIX 2005 Annual Technical Conference, FREENIX Track, pp. 41-46.

The modified QEMU first looks at the volume it is running from, to determine if the volume is a USB device, and if so, which USB device it is. The modified QEMU then retrieves 102 the serial number of the USB device from the kernel of the host operating system. To retrieve the serial number under Linux, for example, it reads from /sys/bus/usb/devices/<devicename>/serial. The modified QEMU then hashes 104 that serial number and takes some bytes of the hash as a seed to a random number generator. A function performing one of the Secure Hash Algorithms, e.g., SHA-1 or SHA-256 would be suitable for performing the hashing. The lower 4 bytes of the hash are a suitable seed for the random number generator. The output of the random number generator is used to generate 106 device names for virtual machine hardware devices and to generate a network MAC address. In some implementations, this is done by using an ASCII string (for each byte b from the random number generator, calculate the ASCII by 32+(95*b)/256) to replace the device names of the virtual optical and hard disk drives of the virtual machine, and 3 bytes from the random number generator are used to replace the last 3 bytes of the network MAC address of the virtual machine. The newly created device names are stored 108 in the virtual machine. More specifically, the device names are changed by overwriting fields in the device structures representing the virtual device in QEMU. For example, in QEMU 0.8.1, to change the hard drive model and serial number string, the ide_identify function is modified as it populates the IDEState structure. To modify the NIC (network interface card) structure, the nd_able initialization code in the net_client_init function is modified. After the modifications to the virtual device names and numbers have been made, QEMU starts the virtual machine as normal.

More generally, the method can use a function that generates and installs hardware identifiers for the virtual hardware devices in the virtual machine. In some implementations, this can be implemented by modifying the virtual machine monitor to implement the function, which replaces the virtual hardware device identifiers used by the activation process when the virtual machine is run. Alternatively, if the file format for a virtual machine allows the identifiers to be specified from outside the virtual machine, an external program that implements the function and rewrites the virtual machine description file to include the generated identifiers can be used.

Note that this technique can be applied in any system that can virtualize hardware descriptors. For example, some computer BIOSes, with the assistance of the platform chipset, can intercept I/Os to and from devices and virtualize or otherwise simulate whole devices or parts of devices. Such software can intercept the hardware descriptors returned by the devices and modify them using the above technique.

The authentication device can advantageously be used as a distribution medium for a copy of the virtual machine with the software product installed. For example, if a Windows operating system is installed on a virtual machine on a USB drive and is activated, then the virtual machine on the drive can be used on any computer and Windows will run off the drive. Copy protection is provided because if the USB drive were not present, Windows would require re-activation.

Alternatively, the authentication device can used to provide credentials without being used as a medium storing the virtual machine.

Alternatively, the modified QEMU prompts for a user password instead of reading the USB serial number. The password is hashed, e.g., using an SHA-256 hash function, and used to generate the virtual hardware IDs as above. The modified QEMU can check the password hash against a locally stored hashed copy to warn the user if the user entered a bad password, rather than requiring the user to wait for the virtual machine to boot up.

The system can be extended to allow users to change their password. In this case, the modified QEMU chooses a random 256-bit number and uses it instead of the SHA-256 hash. It encrypts the random number, along with a hash of the random number, with the password provided by the user. When the user wishes to start the software requiring activation, the user types in the password. QEMU attempts to decrypt the random number and checks the hash of the random number. If the hash does not verify the random number, then the user typed the wrong password and QEMU indicates an error to the user. If the hash does verify the random number, then the random number is used to generate the virtual hardware IDs as above. If the user wishes to change the password, the user can supply the old one, which unlocks the random number, and then a new one. QEMU would then decrypt the random number using the old password, check the hash, and then re-encrypt it with the new password.

Alternatively, the modified QEMU requests a biometric scan from the user. If the biometric scan matches a stored biometric profile with sufficient accuracy, then a hash, e.g., one generated using an SHA-256 hash function, of the stored biometric profile can be used to generate the virtual hardware IDs as above. Otherwise, if the biometric scan fails, then the modified QEMU will refuse to start the virtual machine. In some implementations, the modified QEMU creates the stored biometric profile the first time the virtual machine is run.

The discussion above implicitly assumed the product is installed on each virtual machine with a unique product key. Where the product is distributed on a physical medium, e.g., installed on a virtual machine on a USB drive, an OEM (original equipment manufacturer) of the USB can install the product key on the product as part of the process of making recording the virtual machine on the USB drive.

However, virtual machines can be distributed efficiently over a network. For electronic distribution it is desirable to distribute the same generic virtual machine and provide the product key separately.

FIG. 2 illustrates a method for installing a product key on a product installed on a virtual machine that uses a script executed when the virtual machine boots up. In some implementations based on QEMU, for example, a new product key is passed to the virtual machine by writing a file on the virtual machine disk before the virtual machine is started. A boot-up script checks for and obtains 202 a new product key and runs the appropriate API, for example, the SetProductKey method on the win32_WindowsProductActivation interface on the Computer object in WMI (Microsoft Windows Management Instrumentation) to insert 204 the product key into product on the virtual machine.

A programmed process that makes a desired direct modification to the virtual machine, including a modification to a product installed in the virtual machine, can in general be developed. Using a direct modification avoids the need to boot up the virtual machine to apply the modification. Developing such a programmed process can be done by performing the modifying operation on an instance of the virtual machine and observe the changes made to the persistent state to determine the transformation function, and then developing a program that applies the transformation on the virtual machine directly. For example, the product key is normally stored in registry or system files. To determine the transformation function, the original content of a virtual machine is recorded, the product key is changed, and the programmer observes the changes made to the system files and the registry. The programmer then writes a program that inserts the changes automatically into a virtual machine image file.

Applying a transformation to a virtual machine directly has the advantage that it is often faster than a process that requires a machine to boot up. It is more general too, as some products do not provide a way to update their product key.

In this case, the product key is stored outside of the virtual machine and injected by rewriting the virtual machine image before boot up.

FIGS. 3A and 3B illustrate the operation of an injector program that injects a product key for a product installed in a virtual machine. In an electronic distribution, the specific product key can be distributed along with the injector program and a generic copy of the virtual machine. The virtual machine image is modified without powering up the virtual machine.

In some implementations, illustrated by FIG. 3A, the injector program uses 302 a file system library to modify the virtual disk containing the registry and system files. The program uses the file system and registry libraries to change 304 the registry entries to insert the product key into the virtual machine.

In other implementations, illustrated by FIG. 3B, the injector program attaches the virtual disk to a loopback device and mounts 310 the loopback device using a file system library. The program then modifies 312 the registry based on the product key, using a registry library operating on the mounted registry files.

The methods described in reference to FIGS. 3A and 3B can be used when new virtual machine images are distributed. It is often necessary to distribute new versions of a system disk because of software changes and security patches. The use of an injector program allows a new version of a virtual machine image to be updated on the host computer in an automated fashion.

For example, once a product in a virtual machine is activated on a computer, it may have a unique state represented by activation information, as described above. If the virtual machine adopts a new system disk, the product will lose its customized persistent state, and the user will have to re-activate the product. To avoid this, an injector program can be used to extract the activation information from the current version and inject the activation information into a new version of the virtual machine.

Another example is the Windows SID (Security Identifier). This cannot be set in a generic virtual machine image that has a Windows guest operating system. Once set, the SID is kept in persistent store so that Windows does not have to perform the function of obtaining a SID with each reboot. As with the product key, an injector program can extract the SID from a current version of a virtual machine and inject the SID into a new version of the virtual machine.

To implement injectors and transformer programs while the virtual machine or image is not running, the injector or transformer must be able to manipulate the disks, the file systems on them, and the configuration databases (e.g., the registry) in the file systems. A library for reading and writing windows registry files is part of the Samba 4 distribution. The NewSID program from sysinternals shows how to replace the SID of a Windows computer.

The current machine SID of a Windows NT or later computer can be found in the SECURITY hive under the key Policy and the value PolAcDmS.

The injector program can search and replace for all occurrences of he SID. This can be done by opening each file in the MFT and replacing occurrences of the distributed SID in binary form and replacing it with the injected SID. The same should be done for the contents of the "/$Secure" file, which contains most of the ACLs for the file system. In addition, all ACLs in the registry should have the distributed SID replaced with the injected SID. Finally, all the registry hives should be scanned for occurrences of the distributed SID, in textual or binary form, and replace them with the injected SID. The implementation can be made somewhat easier if the injected SID is the same length as the distributed SID in both textual and binary form, because then a straight binary search-and-replace can largely be used. Since registry keys are stored in sorted order, they may need to be resorted after the SID is changed.

The techniques described above for extracting activation information or the SID and inserting it apply not only to virtual machines but also to disk images (such as those created my Symantec Ghost, hosted on a SAN, or direct attached on a storage device). This is especially true of techniques that operate exclusively on virtual disks, such as loopback mounting or using user-level filesystem and registry libraries. In cases such as the SAN or direct attached storage devices are used, instead of loopback mounting, the injector and extractor programs usually access the device representing the volume directly.

Some software comes without activation. Such software is susceptible to being copied many times and used in violation of its license.

Figure 4B:
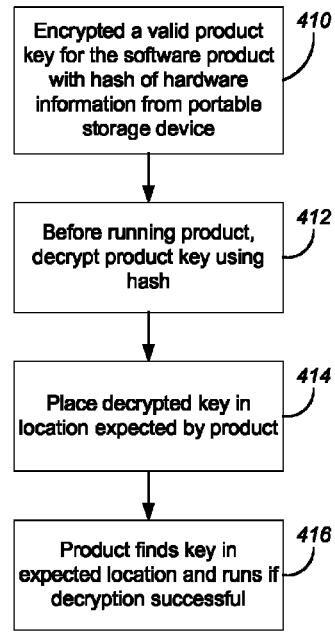

FIGS. 4A and 4B illustrate copy protection methods that operate when a software product is dynamically installed or running from a portable storage device. When the software product runs, it checks for a valid license key and refuses to run if it fails to find one. If the product and a valid license key can be placed on portable storage, then the risk is run that the contents of the portable storage can easily be copied, making license violations significantly easier. One way to avoid this problem is to have the manufacturer of the USB key customize 402 the software product so that it only runs if that USB key or other portable storage device is present. This is done by adding information on what portable storage device the application should run from somewhere in the software product and checking 404 that this portable storage device is present before allowing a user to use the product. For example, the model name and serial numbers of the USB key could be stored in a file on the USB device and the software product could compare that against the model name and serial numbers of attached USB keys.

Alternatively, as shown in FIG. 4B, a valid product key for the software product is encrypted 410 with a symmetric key derived from a hash of the model name and serial number, or other hardware information, of the USB key or other portable storage device. When the user invokes the product but before the product is run, some code attempts to decrypt 412 this file by deriving a second symmetric key using a hash of the model name and serial number of the current USB key or other portable storage device. If this procedure is attempted on a different USB key or device, the second key will not match the first, and the decryption will fail or yield an invalid product key with high probability. The code then either places 414 the decrypted contents in a location (e.g., a file at a well known file path or a registry entry) where the product expects to find a valid product key. If the decryption failed, then the product key can be blanked or set to an invalid product key. If the decryption succeeded and the product key is valid, the product will run 416. A hash can be used to check if the decryption was successful, i.e., the right key was used. Instead of an invalid product key being inserted, an error message can be displayed to the user and the program can refuse to run the software.

Alternatively, the software can be tied to the user by requiring the user to enter a password before using the software. Initially, the user establishes a digital identity with the software product publisher's web site, including the password. The publisher then generates a file with the product key encrypted with a symmetric key derived from the user's password, which the activation module downloads to the user's computer. The activation module prompts the user to enter the password on subsequent runs of the product; if the password matches, then the activation module will derive the same symmetric key from the password, and the activation module will decrypt the product key successfully, and the activation module will insert the product key into a location where the product expects to find a valid product key. The product should then run. If the passwords do not match, then the symmetric keys will not match, and the product key that is decrypted, if any, will likely be invalid, and the product will not run.

Alternatively, the software can be tied to the user by requiring some sort of biometric scan before using the software. Initially, the user establishes the user's identity with the activation module by completing one or more biometric scans. On subsequent runs, the activation module will prompt the user for further biometric scans. If the activation module determines that the biometric scans match the initial scans closely enough, then the activation module will place the license key in the location where the product expects to find a valid product key and the product should run.

Figure 5:
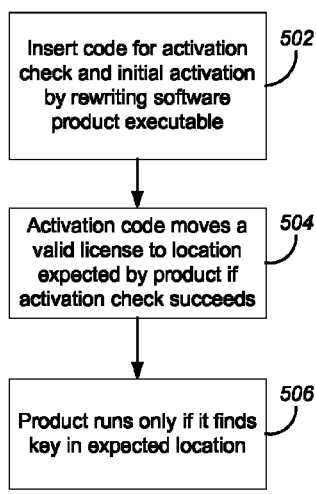
FIG. 5 illustrates a method that inserts code for activation check and initial activation into a software product's executable by rewriting the executable.

FIG. 5 illustrates a method that inserts 502 the code for activation check and initial activation into a software product's executable by rewriting the executable to include the code of the activation module. For example, in a software product that runs under Windows, the activation code can be placed in a dynamic link library (DLL). The rewriter can rewrite the import table of a PE (Portable Executable) format executable file to include the activation DLL. The activation DLL can then implement the activation logic in the DllMain function. Some products require a valid license (e.g., a product key or a license file) to operate. The activation module, after doing its check, moves 504 a valid license into a place where the software product expects to find it. In some implementations, the activation module will copy a file to a location where the software product will read it. In other implementations, the activation module may modify registry entries to insert the product key. The software product runs 506 only if it finds the valid license.

The activation module ties the license and software to something that is limited in number. In some implementations, the license is tied to a specific USB drive, identified by its serial number or by some other unique identifier like a public key stored in it. The unique ID is inserted by the manufacturer of the USB drive at creation, preferably into read-only memory. The activation module checks whether the ID of the USB device matches the ID on which the software was activated.

In some implementations, the license is tied to a characteristic of the user captured by a biometric scan, like a fingerprint reading. In this case, the activation module requests a biometric scan from the user and allows the activation to progress if the biometric results are similar enough to the stored results.

In some implementations, the license is tied to something the user knows, like a password. In this case, the activation module requests a user password and allows the user to proceed if the password or some quantity derived from the password matches an earlier password entered by the user.

The term activation key will be used to refer to the portable device ID or biometric scan result or user password or some combination of them.

The activation module must store the relationship between the license, software, and activation key so that the relationship can persist across restarts. In some implementations, this relationship is expressed in a single file made up of a copy of the license, an ID identifying the software, and the activation key. In some implementations, the name of the file may indicate what software package the file is associated with. In some implementations, the file identifies the software by an SHA-256 hash of some subset of the code and data. In some implementations, the file identifies the software by an identifier that is also embedded in the activation module and encrypted to make reverse engineering more difficult. In some implementations, the software product may require a license data structure to run. This can be stored and extracted from this file.

In other implementations, the license data, software ID, and activation key can be tied together by having the file signed at the activation service by the public key of a trusted third party whose public key is known to the activation module. Or, the signature may be made by a key delegated to by the trusted third party through a certificate mechanism. If sending biometric data or any of the other IDs to the activation service raises privacy concerns, then the IDs can be hashed individually by the activation module and only the hashes sent to the activation service for signing.

The activation module is susceptible to being shimmed and given a false USB ID. By using a USB device that has firmware that can do signing, the activation module can use a challenge response protocol to defeat shimming. In some implementations, the activation module sends a random number to the USB device to be signed. The USB device responds with some random data of its own followed by the random number, the whole string being signed by its private key. The activation module can then check the signature using the public key of the USB device (which is coded into the activation module) to gain confidence that it is communicating with the USB device.

Communication to the USB device can be done by writing to a special region of blocks of the disk and communication from the USB device can be done by reading from another special region of blocks on the disk. This region may be made accessible through the FAT file system by making a file whose clusters incorporate both regions.

Carrying software on the USB drive allows us to access the software on other host computers. Plugging the USB drive into a host can compromise the security of the host; similarly, the host computer may compromise the actions taken by the user when interacting with the software on the USB drive. The following describes ways to mitigate the risks.

Today, auto-running a CD or USB device which is plugged into the computer launches a program with the full privileges of the user. Instead, such a program could be run as a user with limited access to the network and file systems. A complementary way to implement this is through OS-level virtualization to sandbox the program, limiting the APIs it can call. Green Border Technologies GreenBorder Pro is an example of such a sandbox.

On the host side, a keylogger installed on the host computer may log all the keystrokes sent to the application on the USB drive. In the case we are running a virtual machine monitor, we can protect confidential information such as credit card numbers, social security card numbers, and password to various accounts as follows. Whenever the user is prompted for sensitive data, the user could type in some special key sequence to indicate that sensitive data is to be entered. The keylogger never sees the confidential information.

Suppose the special sequence is $xyz$. Instead of typing in the visa card number directly, the user can type "$xyz$visa." When the virtual machine, or the monitor, sees the sequence, it reads the encrypted visa card number from the USB drive, decrypts it with a key embedded in the virtual machine monitor, and sends the card number (via a standard secure channel) to the receiving party. Similarly, instead of a password, the user can type in $xyz$ followed by the password that the user has chosen. The virtual machine, or the monitor, encrypts the sequence based on the user digital identity on the USB drive before sending the password to the receiving party. In this case, even the user does not know that the real password is being used. This scheme requires that the user always uses the virtual machine monitor to communicate password information to the receiving party.

Another way of sending sensitive data is to have the user carry an active mobile device with the ability to enter data and sending encrypted data to a computer, for example via Bluetooth, wireless USB, etc. The user can type all the sensitive information on the mobile device, and the virtual machine, or the monitor, can decrypt the information and supply it to the application program.

If the host computer has intimate knowledge about the internals of the virtual machine monitor, it can peek into the hardware registers, for example, as the virtual machine monitor runs and get at the confidential information. If the underlying host is a hypervisor, then there is less of a chance of having a compromised hypervisor.

Alternatively, the platform can certify to the user that it is running software trusted by the user. This can be done using attestation. The platform would generate a signed statement attesting to the software running on it; at the lowest level, the signature would be done by trusted hardware. A program run from the USB drive could send this signed statement to a remote service trusted by the user that would check the statement. If the statement is valid, and the remote service believes the software to be trustworthy, the remote service would return some secret only known by it and the user, for example, an image or a sentence from the user's favorite novel.

The portable drive can refuse to reveal the information to the computer until the user presses a button on the portable drive or toggles a switch. The button or switch will cause the device to simulate the attachment of an additional mass storage device, perhaps on a USB hub, containing the additional user data.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The term data processing apparatus encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer-readable medium can be a machine-readable storage device, a machine-readable storage substrate, a memory device, or a combination of one or more of them. Computer-readable media suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a personal digital assistant (PDA), a mobile audio or video player, a game console, a Global Positioning System (GPS) receiver, to name just a few. And the processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method in connection with a hardware-based software product activation process that uses a group of hardware device descriptors to identify a computer in activating the software product, the method comprising:
    deriving one or more different descriptor values from a first hardware device;
    establishing the one or more different descriptor values as one or more of the respective hardware device descriptors in the group of hardware device descriptors to identify a virtual machine before the software product is run or activated on the virtual machine;
    wherein the one or more different descriptor values are established as hardware device descriptors for the virtual machine; and
    wherein the virtual machine resides on the first hardware device, and wherein the virtual machine comprises an operating system installed within the virtual machine.

2. The method of claim 1, wherein the first hardware device is a USB flash memory.

3. The method of claim 1, wherein the one or more different descriptor values are derived from a user password.

4. The method of claim 1, wherein the one or more different descriptor values are derived from a stored biometric profile.

5. A non-transitory computer-readable storage medium storing instructions that when executed by a computer cause the computer to perform a method in connection with a hardware-based software product activation process that uses a group of hardware device descriptors to identify a computer in activating the software product, the method comprising:
    deriving one or more different descriptor values from a first hardware device;
    establishing the one or more different descriptor values as one or more of the respective hardware device descriptors in the group of hardware device descriptors to identify a virtual machine before the software product is run or activated on the virtual machine;
    wherein the one or more different descriptor values are established as hardware device descriptors for the virtual machine; and wherein the virtual machine resides on the first hardware device, and wherein the virtual machine comprises an operating system installed within the virtual machine.

6. An apparatus to facilitate a hardware-based software product activation process that uses a group of hardware device descriptors to identify a computer in activating the software product, the apparatus comprising:
- a derivation mechanism configured to derive one or more different descriptor values from a first hardware device;
- a descriptor mechanism configured to establish the one or more different descriptor values as one or more of the respective hardware device descriptors in the group of hardware device descriptors to identify a virtual machine before the software product is run or activated on the virtual machine;
- wherein the one or more different descriptor values are established as hardware device descriptors for the virtual machine; and
- wherein the virtual machine resides on the first hardware device, and wherein the virtual machine comprises an operating system installed within the virtual machine.

* * * * *